(12) United States Patent
Fernandez Manzano et al.

(10) Patent No.: US 12,120,771 B2
(45) Date of Patent: Oct. 15, 2024

(54) METHOD, SYSTEM AND NON-TRANSITORY COMPUTER-READABLE MEDIUM FOR THE UNAMBIGUOUS IDENTIFICATION OF NON-ASSOCIATED WI-FI DEVICES

(71) Applicant: AOIFE SOLUTIONS, S.L., Camas (ES)

(72) Inventors: Jesus Fernandez Manzano, Camas (ES); Pablo Aguilera Bonet, Camas (ES); Jose Antonio Delgado Alfonso, Camas (ES); Jose Ayub Gonzalez Garrido, Camas (ES)

(73) Assignee: AOIFE SOLUTIONS, S.L., Camas (ES)

( * ) Notice: Subject to any disclaimer, the term of this patent is extended or adjusted under 35 U.S.C. 154(b) by 367 days.

(21) Appl. No.: 17/712,684

(22) Filed: Apr. 4, 2022

(65) Prior Publication Data
US 2022/0408236 A1  Dec. 22, 2022

(30) Foreign Application Priority Data
Jun. 18, 2021 (EP) .................................. 21382542

(51) Int. Cl.
*H04W 48/16* (2009.01)
*H04W 8/00* (2009.01)
(Continued)

(52) U.S. Cl.
CPC ............. *H04W 8/005* (2013.01); *H04W 8/26* (2013.01); *H04W 48/16* (2013.01); *H04W 84/12* (2013.01)

(58) Field of Classification Search
CPC ....... H04W 8/005; H04W 8/26; H04W 48/14; H04W 48/16; H04W 84/12
See application file for complete search history.

(56) References Cited

U.S. PATENT DOCUMENTS 7,804,806 B2 * 9/2010 Borkar .................... H04L 45/16
370/328
7,826,869 B2 * 11/2010 Nagarajan ............... H04W 8/08
455/446

(Continued)

FOREIGN PATENT DOCUMENTS

CN      104718779 B  * 10/2018  ............ H04W 48/14
WO    2021104657 A1    6/2021

OTHER PUBLICATIONS

Jeremy Martin, et al., "A Study of Mac Address Randomization in Mobile Devices and When It Fails", Arxiv,Org., pp. 1-23, 2017.
(Continued)

*Primary Examiner* — Wutchung Chu
(74) *Attorney, Agent, or Firm* — LUCAS & MERCANTI, LLP

(57) ABSTRACT

A method, system and non-transitory computer-readable medium for the unambiguous identification of non-associated Wi-Fi devices, where upon receiving (102), by an access point (200), a probe request (202) from a Wi-Fi device (201) not associated to the access point (200), sending (104) a probe response (204) addressed to the non-associated Wi-Fi device (201), wherein the probe response (204) comprises a Hotspot 2.0 Indication element (206) including a ANQP Domain ID field (207) with a determined value; receiving (106), by the access point (200), an action frame (208) sent by the non-associated Wi-Fi device (201) in response to the Hotspot 2.0 Indication element (206) of the probe response (204); obtaining a static MAC address (209) of the non-associated Wi-Fi device (201) from the source address of the received action frame (208); and identifying (110) the non-associated Wi-Fi device (201) based on the obtained static MAC address (209).

11 Claims, 6 Drawing Sheets

(51) Int. Cl.
 *H04W 8/26* (2009.01)
 *H04W 84/12* (2009.01)

(56) References Cited

U.S. PATENT DOCUMENTS

| | | | | |
|---|---|---|---|---|
| 9,894,604 | B1* | 2/2018 | Tran | H04W 12/08 |
| 10,264,515 | B2* | 4/2019 | Horn | H04W 48/16 |
| 10,771,438 | B2* | 9/2020 | Zuniga | H04W 12/08 |
| 2006/0002334 | A1* | 1/2006 | Washburn, III | H04W 12/062 |
| | | | | 370/328 |
| 2007/0032219 | A1* | 2/2007 | Rudolf | H04W 12/06 |
| | | | | 455/404.1 |
| 2012/0178407 | A1* | 7/2012 | Rudolf | H04W 4/90 |
| | | | | 455/404.1 |
| 2013/0121325 | A1* | 5/2013 | McCann | H04W 8/18 |
| | | | | 370/338 |
| 2013/0316705 | A1* | 11/2013 | Kneckt | H04L 67/51 |
| | | | | 455/435.1 |
| 2015/0195772 | A1* | 7/2015 | Huang | H04W 48/20 |
| | | | | 455/434 |
| 2016/0087967 | A1* | 3/2016 | Pang | H04W 76/11 |
| | | | | 726/6 |
| 2016/0269930 | A1* | 9/2016 | Huang | H04W 8/26 |
| 2018/0324886 | A1* | 11/2018 | Jung | H04W 48/20 |
| 2018/0359811 | A1* | 12/2018 | Verzun | H04L 12/28 |
| 2019/0036993 | A1* | 1/2019 | Lavi | H04L 61/5069 |
| 2022/0322076 | A1* | 10/2022 | Wu | H04W 8/26 |

OTHER PUBLICATIONS

DVB Organization, "WR-SP-WIFI-MGMT-106-160111-1.pdf", DVB, p. 64, 2016.
Extended European Search Report corresponding to EP21382542 dated Nov. 30, 2021, 9 pages.

* cited by examiner

208

```
∨ IEEE 802.11 Action, Flags: ........
    Type/Subtype: Action (0x000d)
  > Frame Control Field: 0xd000
    .000 0000 0011 1100 = Duration: 60 microseconds
    Receiver address: 06:f0:21:19:79:3d (06:f0:21:19:79:3d)
    Destination address: 06:f0:21:19:79:3d (06:f0:21:19:79:3d)
    Transmitter address: SamsungE_83:5f:c9 (90:b1:44:83:5f:c9)
    Source address: SamsungE_83:5f:c9 (90:b1:44:83:5f:c9)
    BSS Id: 06:f0:21:19:79:3d (06:f0:21:19:79:3d)
    .... .... .... 0000 = Fragment number: 0
    0000 0000 0000 .... = Sequence number: 0
∨ IEEE 802.11 Wireless Management
  ∨ Fixed parameters
      Category code: Public Action (4)
      Public Action: GAS Initial Request (0x0a)
      Dialog token: 0x00
      Tag Number: Advertisement Protocol (108)
      Tag length: 2
    > Advertisement Protocol element: ANQP
    ∨ Query Request: ANQP Request - ANQP Query list
        Query Request Length: 28
      > Info ID ANQP Query list (256)
      > Info ID ANQP vendor-specific list (56797) - HS 2.0 HS Query list
```

209 — static MAC

500 — GAS Initial Request (0x0a)

502 — ANQP Query list (256)

504 — ANQP vendor-specific list (56797) - HS 2.0 HS Query list

FIG. 5

METHOD, SYSTEM AND NON-TRANSITORY COMPUTER-READABLE MEDIUM FOR THE UNAMBIGUOUS IDENTIFICATION OF NON-ASSOCIATED WI-FI DEVICES

CROSS-REFERENCE TO RELATED APPLICATION

This application claims the benefit of priority from European Patent Application No. 21382542, filed Jun. 18, 2021, the content of which is incorporated herein by reference.

FIELD OF THE INVENTION

The present disclosure relates to wireless communication systems, and more particularly to methods and systems for identifying Wi-Fi devices when they are not connected to a Wi-Fi network.

BACKGROUND OF THE INVENTION

A WiFi network is a type of WLAN that follows the IEEE 802.11 standard. For the sake of simplicity, and without loss of generality, and entity that provides wireless access to a plurality of user devices is hereby referred to as an access point (AP), and a user device is referred to as a station (STA). A station may be associated or not associated to the WiFi network. When a station is associated with an access point, the access point knows the static MAC address, and therefore the station is identified.

However, it is very difficult for an access point to identify non-associated Wi-Fi devices (i.e. stations that are not associated with the access point), especially when they employ MAC address randomization.

Traditional WiFi analytics vendors do not address this problem, looking the other way with respect to the random MACs of non-associated WiFi devices. That is, they simply discard all frames that arrive with random MACs (ignoring 95% of modern smartphones).

With respect to the scientific literature and patents, there are known methods used to identify the non-associated stations that rely on analytics, focusing on analyzing the capabilities encapsulated in the Probe Requests. For instance, the method disclosed in patent document WO2021104657-A1 is based on the extraction of distinctive fields from received probe request frames and their subsequent classification using cluster analysis, wherein a device creates a footprint from the Probe Requests with random MACs of nearby devices and groups different probes with the same device. This way, multiple random MACs that are grouped together are considered to correspond to the same device, and this device is therefore identified.

Other known methods choose to use Bluetooth when the Wi-Fi MAC is randomized, which is not very convenient because people tend to have Bluetooth turned off.

The present invention presents another, more direct approach to identify the non-associated stations, in which the attention of nearby non-associated devices is attracted to trigger them to send a frame with their static MAC address.

DESCRIPTION OF THE INVENTION

The present invention relates to a system and method for the unambiguous identification of non-associated Wi-Fi devices.

During normal operation, non-associated Wi-Fi devices just keep sending probe request with random MACs and cannot be stimulated until they are associated (connected) to an access point. When they are not associated, they only send Probe Request frames that can be listened to by any access point in the vicinity.

The present invention uses one or more access points that create a bait to the non-associated stations, so that when they are in the vicinity and listen to the bait, they reveal relevant information used for identifying the station. In particular, the access points provoke or force the station passing nearby to send a frame with its static MAC address. Otherwise, such a device with no intention to associate would never reveal its static MAC address. Advantageously, the method does not require the Wi-Fi of the non-associated station (e.g. the mobile phone's Wi-Fi) to be activated for the mobile phone to respond to the bait, which is set by advertising a Hotspot 2.0 Indication element.

Until now, a user that wanted to connect to a public network had to follow a tedious process including registering and requesting access with login and password. With Hotspot 2.0, users connect to a secure Wi-Fi network in the same way as they do with a mobile phone network: automatically, passively, and transparently. Hotspot 2.0 is a new mechanism in modern Wi-Fi networks for a mobile device to connect to public networks (hotspots) automatically, using the credentials stored on your mobile SIM card. In this way, the user connects to the WiFi network without interruption when he/she arrives at a location where a Hotspot 2.0 (HS20) compatible network is deployed. Mobile operators also benefit, since they can offload 4G/5G traffic to the Wi-Fi network, relieving their infrastructure of a large part of the congestion they cannot handle.

The present invention provides a new mechanism for unveiling the unique identifier (static MAC address) of non-associated stations which usually only show random MACs. Newer Android devices leak a static MAC address in a certain Hotspot 2.0 (HS20) frame. The proposed method consists in provoking the stations to send this frame and track the static MAC address obtained.

The invention provides a solution to identify non-associated Wi-Fi devices that is scalable and can be simultaneously used by a plurality of access points, provoking the continuous transmission of the static MAC address over time.

This incentive to reveal their static MAC is achieved by advertising different HS20 profiles every certain amount of time. An access point implementing the method only uses one HS20 profile, but changes an identifier of the HS20 profile periodically (in particular, the ANQP Domain ID), so ultimately it is like different profiles are used. If said identifier is not periodically changed, the target device would only respond the first time.

The advertising is done by sending specific Probe Response frames. The 802.11 standard defines an Information Element (IE) for HS20 known as "Hotspot 2.0 Indication". This is the information element that is going to be modified periodically.

At this point, it is useful to clarify the differences between the various MAC addresses to be considered in Wi-Fi devices:

The real MAC address is the global MAC address written on the board that uniquely identifies the device. Modern devices do not use it, even if they are associated with the network.
 Static MAC address: the MAC address used by the device when it connects to a network. It is built for each ESS (Extended Service Set). It is permanent until it connects to a different ESS (e.g. it will be a different one for the same device at work, at home, or in a hotel). The important aspect is that it is static, it does not change continuously.

Random MAC address: the local MAC address that devices send in their Probe Request frames. They change constantly (with different cadences, even several times per second) to avoid Wi-Fi analytics systems.

The present invention is able to revert from random MAC address to static MAC address. This is sufficient to uniquely identify the devices on each scenario, and thus be able to count them, locate them, track them, etc. In some cases, it reverts directly from random MAC address to real MAC address.

The present invention introduces a novel method for unveiling the static identifier of devices not associated to a WiFi network (the static MAC address). The method modifies the normal behaviour of the access points so that nearby non-associated devices send discovery frames with their static MAC address, thus revealing a much more stable identifier than random MACs that are constantly changing. The information collected serves as a temporary unique identifier of a device, allowing the system to store this data for analytics.

A first aspect of the present invention refers to a method for the unambiguous identification of non-associated Wi-Fi devices. The method comprises the following steps:

Upon receiving, by an access point, a probe request from a Wi-Fi device not associated to the access point, sending a probe response addressed to the non-associated Wi-Fi device, wherein the probe response comprises a Hotspot 2.0 Indication element including a ANQP Domain ID field with a determined value.

Receiving, by the access point, an action frame sent by the non-associated Wi-Fi device in response to the Hotspot 2.0 Indication element of the probe response.

Obtaining a static MAC address of the non-associated Wi-Fi device from the source address of the received action frame.

Identifying the non-associated Wi-Fi device based on the obtained static MAC address (209).

A second aspect of the present invention refers to a system for the unambiguous identification of non-associated Wi-Fi devices. The system comprises one or more access points, each access point including a Wi-Fi interface and a processing unit configured to perform the steps of the method.

A third aspect of the present invention refers to a non-transitory computer-readable medium for the unambiguous identification of non-associated Wi-Fi devices, comprising executable programming instructions stored thereon that, when executed by a processor, cause the processor to carry out the steps of the method.

BRIEF DESCRIPTION OF THE DRAWINGS

A series of drawings which aid in better understanding the invention and which are expressly related with an embodiment of the said invention, presented as a non-limiting example thereof, are very briefly described below.

FIG. 5 shows an example of an action frame including the static MAC address of the non-associated Wi-Fi device, which is sent in response to the probe response of FIG. 4.

DESCRIPTION OF A PREFERRED EMBODIMENT OF THE INVENTION

Figure 1:
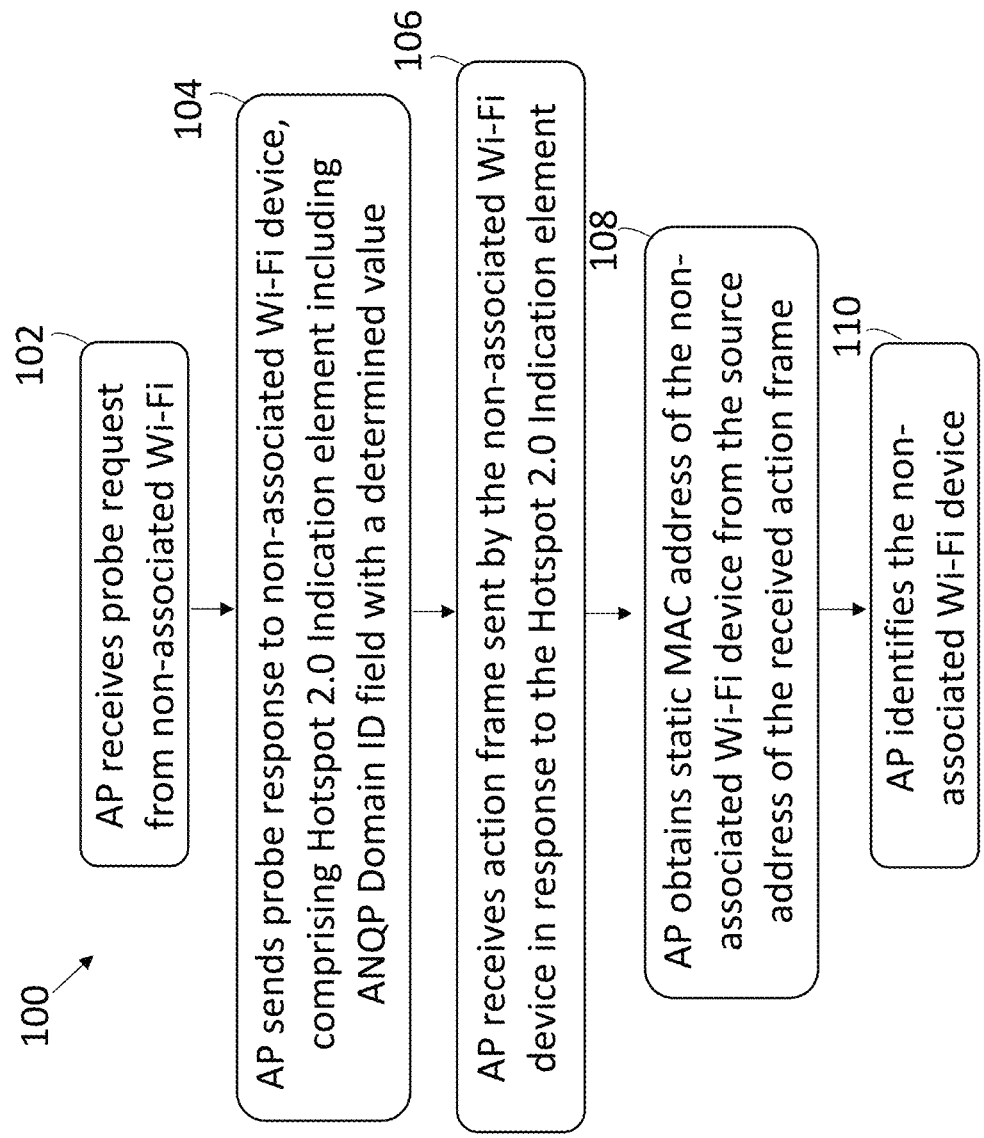
FIG. 1 depicts, according to an embodiment of the present invention, a flow diagram of the steps of the method for the unambiguous identification of non-associated Wi-Fi devices.

FIG. 1 represents a flow diagram of a method 100 for the unambiguous identification of non-associated Wi-Fi devices according to an embodiment of the present invention.

First, an access point (AP) receives 102 a probe request from a Wi-Fi device which is currently not associated to the AP. As a probe response, the AP sends 104 a probe response addressed to said non-associated Wi-Fi device. The probe response includes a Hotspot 2.0 Indication element, which in turn includes an ANQP Domain ID field with a determined value.

The AP receives 106 an action frame sent by the non-associated Wi-Fi device in response to the Hotspot 2.0 Indication element of the probe response. The AP then obtains 108 a static MAC address of the non-associated Wi-Fi device from the source address of the received action frame. Finally, the AP identifies 110 the non-associated Wi-Fi device based on the obtained static MAC address.

Figure 2:
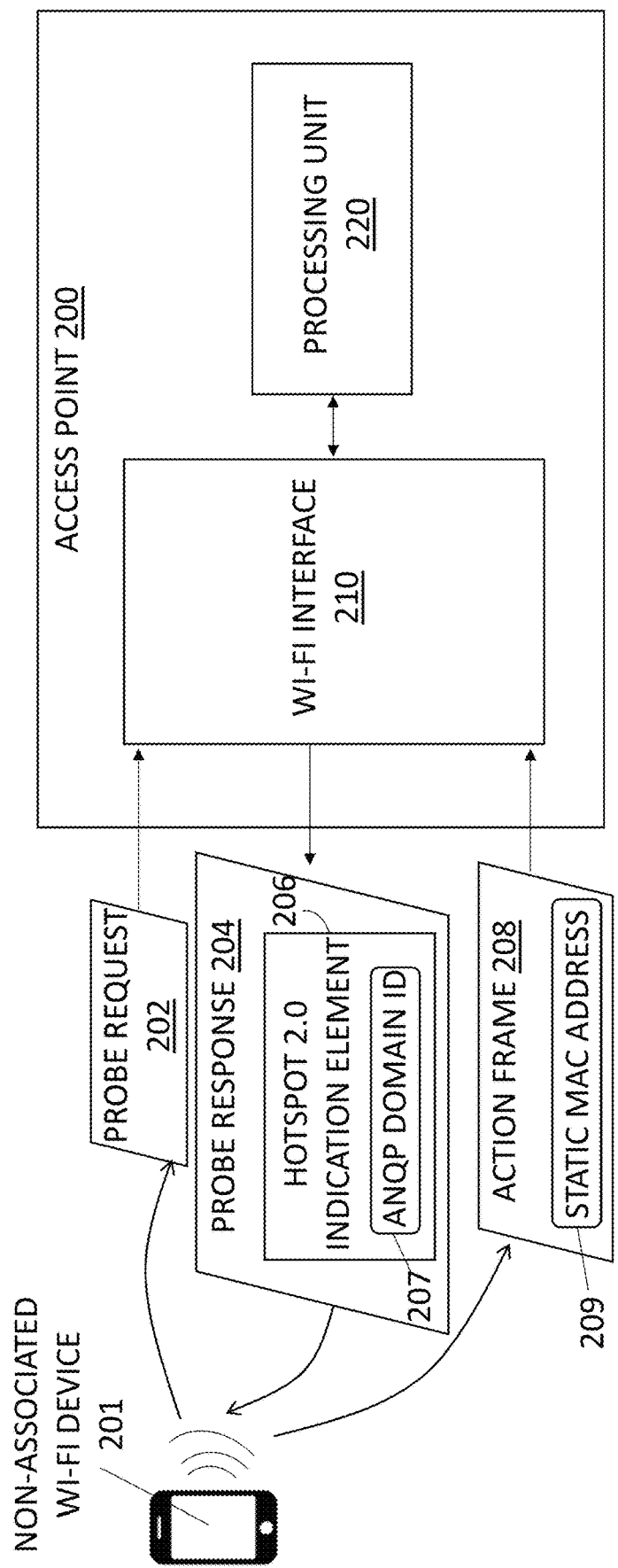
FIG. 2 represents, according to an embodiment of the present invention, a system for the unambiguous identification of non-associated Wi-Fi devices.

FIG. 2 depicts a system for the unambiguous identification of non-associated Wi-Fi devices according to an embodiment of the present invention. In the embodiment, the system comprises an access point 200, which in turn includes a Wi-Fi interface 210 and a processing unit 220.

The processing unit 220 is configured to implement the steps of the method. In particular, upon receiving a probe request 202 from a Wi-Fi device 201 not associated to the access point 200, the processing unit 220 is configured to send (through the Wi-Fi interface 210) a probe response 204 addressed to the non-associated Wi-Fi device 201, wherein the probe response 204 comprises a Hotspot 2.0 Indication element 206 including a ANQP Domain ID field 207 with a determined value.

The processing unit 220 is also configured to receive an action frame 208 sent by the non-associated Wi-Fi device 201 in response to the Hotspot 2.0 Indication element 206 of the probe response 204, and obtain a static MAC address 209 of the non-associated Wi-Fi device 201 from the source address of the received action frame 208. The access point 200 can now identify the non-associated Wi-Fi device 201 using the obtained static MAC address 209.

Figure 3:
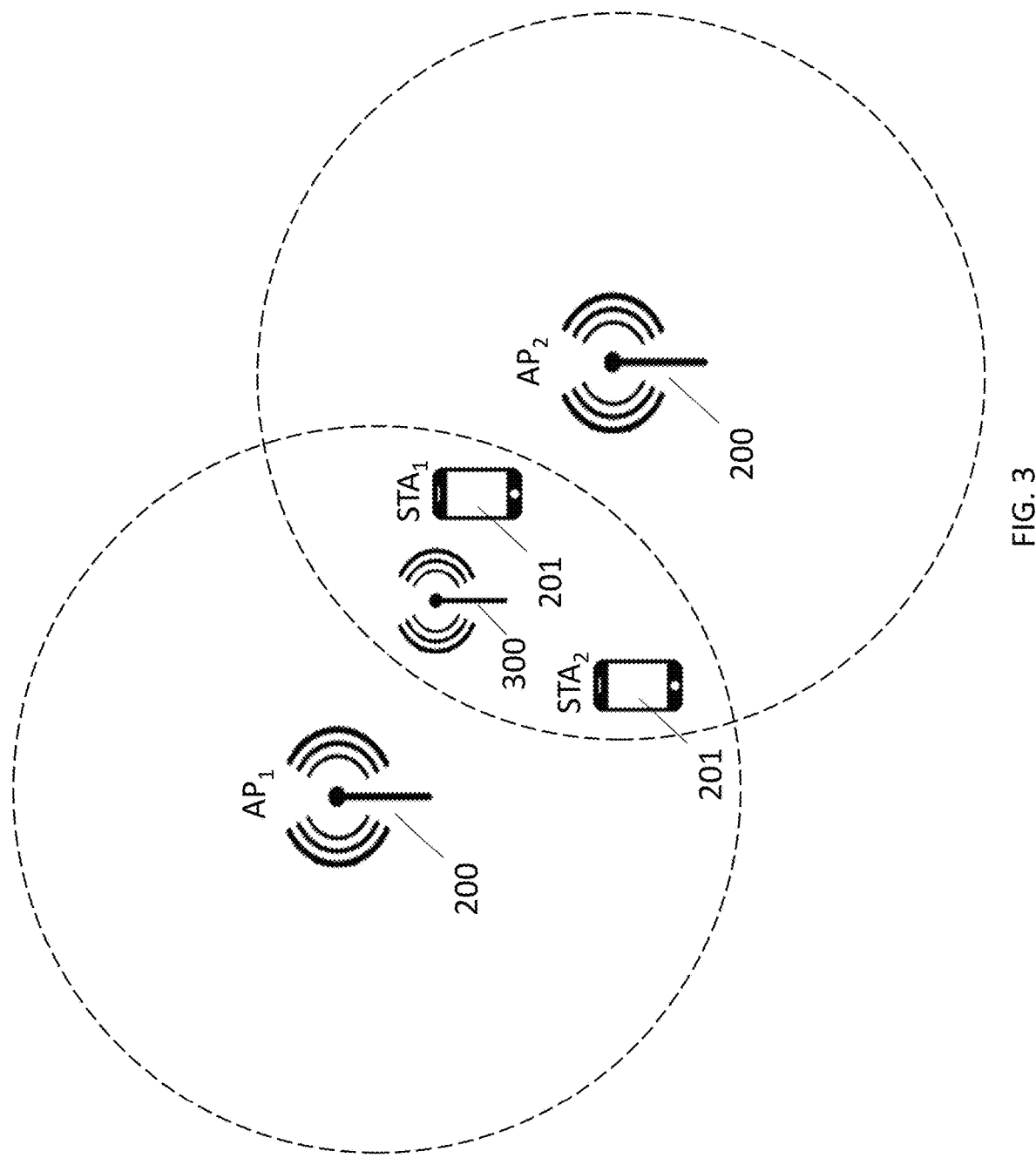
FIG. 3 shows an exemplary embodiment of the system comprising several access points.

The system of the present invention may comprise a plurality of access points 200 as described in FIG. 2. FIG. 3 shows an exemplary embodiment of the system comprising a plurality of access points 200, namely $AP_1$ and $AP_2$. The access points 200 of the system are configured to identify non-associated Wi-Fi devices 201 (such as the depicted $STA_1$ and $STA_2$) which are located within their respective range and are associated with another access point 300, which is not an element of the system (alternatively, the stations 201 may be not associated with any access point). Using the configuration described in FIG. 2, each access point 200 of the system can identify each one of the non-associated Wi-Fi devices 201.

The Hotspot 2.0 specification defines a new information element called the Hotspot 2.0 Indication element 206. This element serves a similar purpose as the Extended Capabilities element. Its basic purpose is to indicate support for, and compliance with, Passpoint™ (Hotspot 2.0) certification. To advertise support for Hotspot 2.0, the Interworking bit in the Extended Capabilities information element needs to be set in the Beacon and Probe Response frames. A Hotspot 2.0 Indication element 206 is therefore included in the probe response 204 to enable the access points 200 to indicate to non-associated Wi-Fi devices 201 (stations) that they are Hotspot 2.0 capable. The Hotspot 2.0 Indication element 206 uses the vendor-specific information element and is included in every Beacon frame and Probe Response frame from an ESS (Extended Service Set) that supports Hotspot 2.0.

Figure 4:
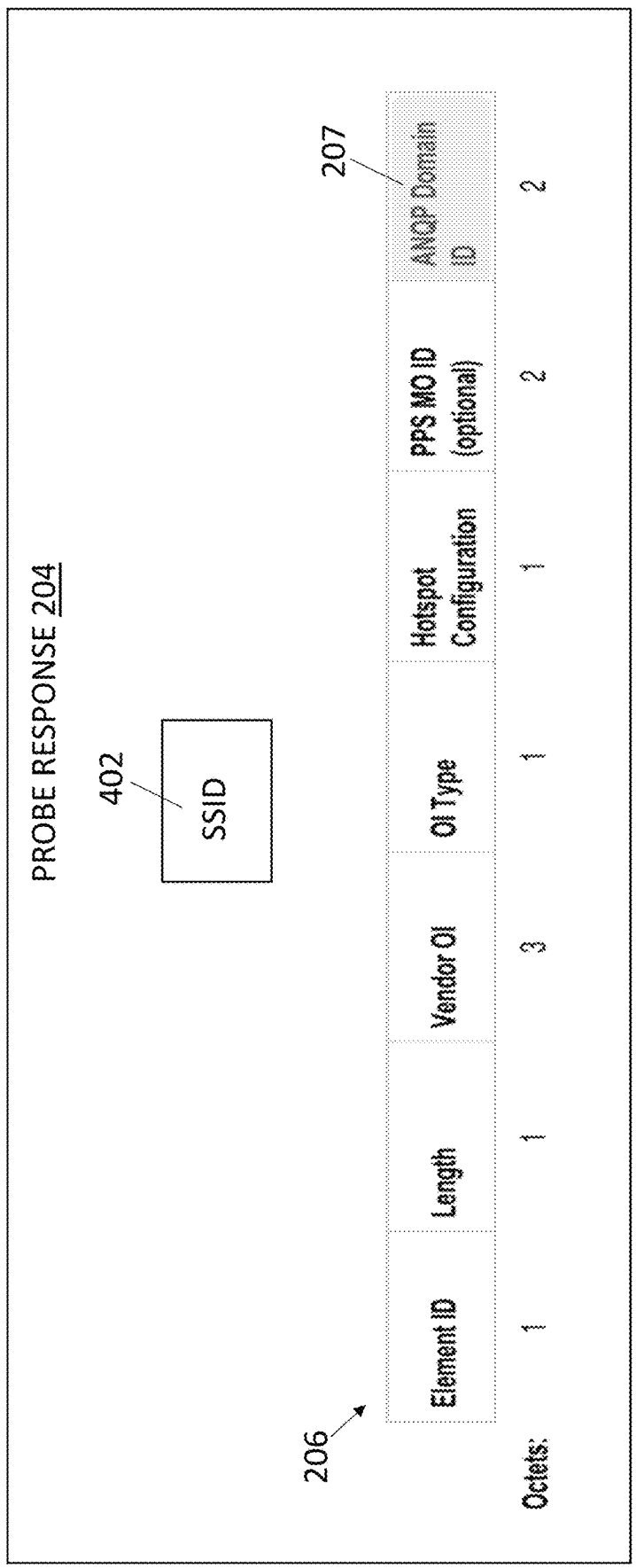
FIG. 4 shows a probe response sent by an access point according to the present invention.

FIG. 4 depicts an exemplary probe response 204 sent by the access points 200 including two relevant information elements (the probe response 204 includes more fields which are not depicted in the figure): a Hotspot 2.0 Indication (HS20) element 206 and an SSID (Service Set Identifier) field 402. FIG. 4 also shows the different fields forming a Hotspot 2.0 Indication (HS20) element 206 according to the IEEE 802.11u standard for interworking with external networks. According to this standard, the Hotspot 2.0 Indication element 206 contains a field, the ANQP (Access Network Query Protocol) Domain ID 207. The ANQP Domain ID field 207 contains the ANQP domain identifier of the access point. All access points in the same ESS (Extended Service Set) that share a common non-zero value of ANQP Domain ID 207 have identical ANQP information for the ANQP-elements and Hotspot 2.0 Vendor Specific ANQP-elements defined in the standard. According to the present invention, the ANQP Domain ID field 207 is always included in the probe response 204, this field having a determined value which may change with time.

When a station (i.e. a non-associated Wi-Fi device 201) receives the probe response 204 including a Hotspot 2.0 Indication element 206, the station asks the access point 200 for the complete HS20 profile corresponding to the received ANQP Domain ID 207. For requesting this info, the station sends an action frame 208 that is used by the access point 200 to extract the static MAC address 209 of the station. Said action frame 208 is a management frame that encapsulates a GAS (Generic Advertisement Service) Initial Request 500. As depicted in the example of FIG. 5, the GAS Initial Request includes an ANQP Query List 502 and a HS Query List 504 (ANQP vendor-specific list). The station sends this particular action frame 208 using a MAC address that does not change with time: its static MAC address 209.

The stations only send this action frame 208 the first time they discover a new ANQP Domain ID 207, or a new combination of ANQP Domain ID 207 and SSID 402 in the probe response 204. The access points 200 of the system of the present invention are configured to force the stations to send this action frame 208 at least once, so that its static MAC address 209 can be obtained and the station can be identified.

In an embodiment, the access points are configured to force the station to repeatedly send this action frame 208, so that its static MAC address 209 and the RSSI (Received Signal Strength Indicator, i.e. the signal strength) can be continuously obtained and stored in real time. To that end, the value of the ANQP Domain ID field 207 is modified each time a probe response 204 is sent again to the same non-associated Wi-Fi device 201.

In an embodiment, the combined value of the ANQP Domain ID field 207 and the SSID field 402 of the probe response 204 is modified each time a probe response 204 is sent again to the same non-associated Wi-Fi device 201.

In an embodiment, since a station asks for each different HS20 profile they see advertised, the access points 200 are configured to periodically advertise different HS20 profiles to provoke a response from the stations, by periodically modifying the value of the ANQP Domain ID 207 to be used in the next probe responses 204 (e.g. increasing the value of ANQP Domain ID 207 every 5 seconds, wherein the updated value will be used in the next probe responses 204 transmitted by the access point 200 until said value is again updated) and listen to the reply from the station. The ANQP Domain ID value is therefore repeatedly modified (e.g. increasing or decreasing the value by a certain quantity), wherein the period of time between modifications may be or not constant (e.g. the ANQP Domain ID value is modified after a random period of time comprised between 5 and 6 seconds).

The access points 200 may be further configured to modify the SSID field 402 to be used in the next probe responses 204 when a determined number of different values have been used for the ANQP Domain ID field 207. In an embodiment, the value of the SSID field of the probe response (204) sent to a non-associated Wi-Fi device 201 is randomized whenever it needs changing (e.g. when running out of values for the ANQP Domain ID field 207).

Figure 6:
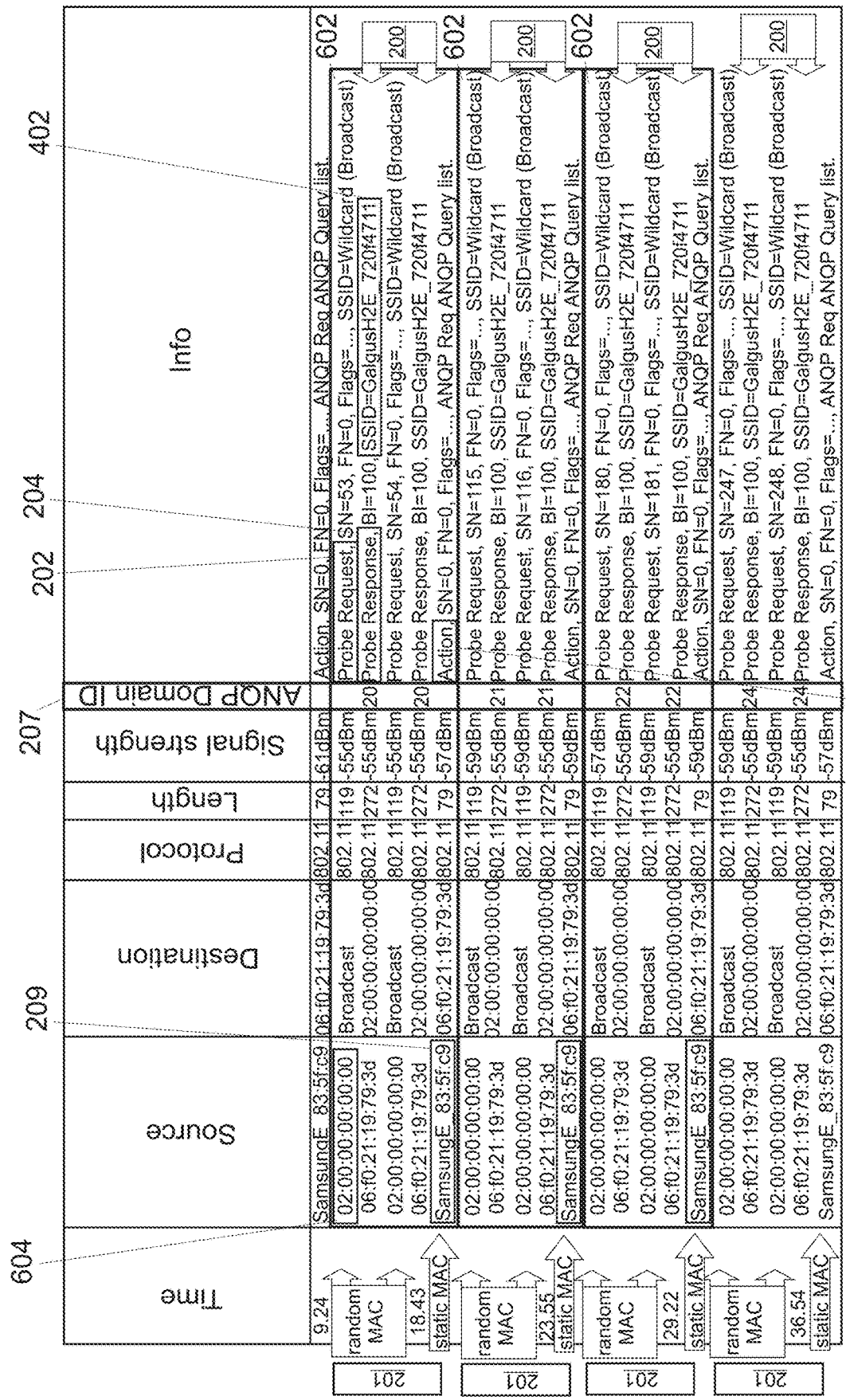
FIG. 6 represents an exemplary communication between a non-associated Wi-Fi device and an access point according to the present invention.

FIG. 6 represents an exemplary communication between a non-associated Wi-Fi device 201 (i.e. a station) and an access point 200 according to the present invention. In each iteration 602 the following sequence is fulfilled:

Non-associated stations are in sleep mode most of the time, the access points 200 can only track them when they wake up to scan the medium. When the non-associated Wi-Fi device 201 wakes up from sleep mode, it sends probe requests 202 (two probe requests in the example) to scan the medium, using a random MAC address 604 (in the example, "02.00.00.00.00.00").

The access point 200 responds with two probe responses 204 that contain an ANQP Domain ID 207.

In response, the non-associated Wi-Fi device 201 sends an action frame 208 that leaks its static MAC address (in the example, "SamsungE_83:5f:c9"), instead of the random MAC address 604 used in its probe requests 202.

As can be seen in the column referring to the ANQP Domain ID field 207, the value of this field varies in the different iterations 602. This is due to the fact that the value of the ANQP Domain ID field 207 is periodically modified (in the example, the value is incremented by 1 each 5 seconds) to advertise a new HS20 profile. Without making this modification in the value of the ANQP Domain ID field 207, the station would only respond the first time. By applying a periodic increment in the value of the ANQP Domain ID field 207, the stations may be continuously identified and tracked.

For instance, a station may be identified at a certain time when entering the coverage range of the access point, the station may be tracked while it remains within coverage range of the access point, the access point may determine the time when the station leaves the area (when out of range, it will no longer be detected and identified by the access point), and the access point may also determine the time when the station returns to the area (when it is again within range of the access point). Moreover, when the system of the invention comprises three or more access points 200 arranged in a same area, a precise tracking (geolocation by triangulation) may be performed.

As can be seen in FIG. 4, the size of the ANQP Domain ID field 207 is 2 bytes (16 bits), which provides the access points with up to $2^{16}$ (i.e. 65536) HS20 profiles available. If the access point 200 increments the ANQP Domain ID field 207 every 5 seconds, the continuous identification of the stations can be roughly performed for around 91 hours before every existing ANQP Domain ID is exhausted. Fortunately, the stations identify the HS20 profile using the combination of SSID 402 and ANQP Domain ID 207, instead of only the ANQP Domain ID 207. Knowing this, the access point 200 only needs to change the combined value of SSID 402 and ANQP Domain ID 207 when the last value for the ANQP Domain ID (e.g. 65535 when incrementing the values from an initial value of 0) is reached.

If for example the following SSID is used "GalgusH2E xxxxxxxx", where each 'x' is a hexadecimal digit, when the access point 200 reaches the last value of the ANQP Domain ID 207, the access point 200 may randomly generate another hex number of 8 digits and start again. This allows $16^8$ (i.e. 4.294.967.296) possible combinations, with 65536 ANQP Domain ID values for each combination.

When the system comprises several access points, arranged for instance in a same installation, the system can track the MAC address and RSSI of the non-associated stations. The access points of the system may periodically change the combined value of the ANQP Domain ID field 207 and the SSID field 402. A random combination of these values (ANQP Domain ID & SSID) may be generated in each access point, so that each access point advertises a different Hotspot 2.0 profile and the stations must respond (with the action frame 208) to all the access points of the system.

For instance, each access point may use an incremental value for the ANQP Domain ID field 207 and a randomized value for the SSID field 402 each time the ANQP Domain ID field 207 reached the last available value (65536). Since there are a huge number of possible SSID combinations (in the previous example, 4.294.967.296 possible SSID combinations), the probability of two different access points in the same installation using the same SSID is negligible (0,0000000002328306436538696).

According to the Wi-Fi operation, each different SSID used by an access point needs a different BSSID (Basic Service Set Identifier). The BSSID normally corresponds to the MAC address of the Wi-Fi interface 210 of the access point 200. When the access point generates a new value for the SSID field 402, a new BSSID is also created. The BSSID is generated so that it does not collide with other BSSIDs in use by any other Wi-Fi interface in the zone. To that end, some particular bits of the BSSID (which normally remain unchanged) may be modified; for instance, the last byte is incremented by one and the locally administered bit (the seventh bit starting from the left of the BSSID) is enabled. When the locally administered bit is set to 1, it indicates that this MAC has been modified and does not correspond to a real MAC of any Wi-Fi device. The access point sets this bit to 1 to avoid accidentally stepping on a real MAC of a Wi-Fi device that is in the vicinity.

The applications of the present invention are multiple, since it is a transversal technology that can be easily applied in a wide range of scenarios. To begin with, a system capable of unveiling the static identifier (static MAC address) of non-associated devices can track them or store these data for further processing. It is up to the network administrator to exploit these data for research, logistics or commercial purposes, among others. The present invention may be used to locate in real-time on a map the Wi-Fi devices in an airport, a shopping center, or a hotel, by using only the Wi-Fi network deployed and without the need to ask permission to users to install annoying applications or make changes in the software of their terminal.

In addition, aggregated and anonymized data from all users at a particular site can be refined using machine learning techniques to perform:

Estimates on masses of people, movements, from the number of nearby devices (there will be users without devices, devices that does not send frames, users with multiple devices, etc).

Prediction of agglomerations, flow patterns of crowds.

Security applications.

Once the real users in an environment have been identified, the system can track them when they visit the facilities where the access points are deployed, as well as exploit the obtained data to improve the deployment of the environment (network level, placement of shops, establishments, and restaurants, etc.).

The invention uses the aforementioned frames to cause a non-associated station (which usually does not react to anything) to reveal its static MAC to an access point. To this end, the access points periodically cause the non-associated station to continuously send the static MAC address by rotating the ANQP Domain IDs and SSIDs. In addition, this solution is scalable and can be used with an arbitrary number of access points.

The invention claimed is:

1. A method for the unambiguous identification of non-associated Wi-Fi devices, the method comprising:
   upon receiving, by an access point, a probe request from a Wi-Fi device not associated to the access point, sending a probe response addressed to the non-associated Wi-Fi device, wherein the probe response comprises a Hotspot 2.0 Indication element including a ANQP Domain ID field with a determined value;
   receiving, by the access point, an action frame sent by the non-associated Wi-Fi device in response to the Hotspot 2.0 Indication element of the probe response;
   obtaining a static MAC address of the non-associated Wi-Fi device from the source address of the received action frame; and
   identifying the non-associated Wi-Fi device based on the obtained static MAC address,
   wherein the combined value of the ANQP Domain ID field and the SSID field of the probe response is modified each time the probe response is sent again to the same non-associated Wi-Fi device.

2. The method of claim 1, further comprising periodically modifying, by the access point, the value of the ANQP Domain ID field to be used in the probe response.

3. The method of claim 2, further comprising modifying the SSID field to be used in the probe response when a determined number of values have been used for the ANQP Domain ID field.

4. The method of claim 3, wherein the value of the SSID field of the probe response is randomized.

5. A system for the unambiguous identification of non-associated Wi-Fi devices, the system comprising at least one access point, wherein each access point comprises:
   a Wi-Fi interface;
   a processing unit configured to:
      upon receiving a probe request from a Wi-Fi device not associated to the access point, send a probe response addressed to the non-associated Wi-Fi device, wherein the probe response comprises a Hotspot 2.0

Indication element including a ANQP (Access Network Query Protocol) Domain ID field with a determined value;

receive an action frame sent by the non-associated Wi-Fi device in response to the Hotspot 2.0 Indication element of the probe response;

obtain a static MAC address of the non-associated Wi-Fi device from the source address of the received action frame; and identify the non-associated Wi-Fi device based on the obtained static MAC address, wherein the processing unit of each access point is configured to modify the combined value of the ANQP Domain ID field and the SSID field of the probe response each time the probe response is sent again to the same non-associated Wi-Fi device.

6. The system of claim 5, wherein the processing unit of each access point is configured to periodically modify the value of the ANQP Domain ID field to be used in the probe response.

7. The system of claim 6, wherein the processing unit of each access point is configured to modify the SSID field to be used in the probe response when a determined number of values have been used for the ANQP Domain ID field.

8. The system of claim 5, wherein the processing unit of each access point is configured to randomize the value of the SSID field of the probe response.

9. A non-transitory computer-readable medium for the unambiguous identification of non-associated Wi-Fi devices, comprising executable programming instructions stored thereon that, when executed by a processor, cause the processor to carry out the steps of the method of claim 1.

10. A method for the unambiguous identification of non-associated Wi-Fi devices, the method comprising:

upon receiving, by an access point, a probe request from a Wi-Fi device not associated to the access point, sending a probe response addressed to the non-associated Wi-Fi device, wherein the probe response comprises a Hotspot 2.0 Indication element including a ANQP Domain ID field with a determined value;

receiving, by the access point, an action frame sent by the non-associated Wi-Fi device in response to the Hotspot 2.0 Indication element of the probe response;

obtaining a static MAC address of the non-associated Wi-Fi device from the source address of the received action frame; and identifying the non-associated Wi-Fi device based on the obtained static MAC address, periodically modifying, by the access point, the value of the ANQP Domain ID field to be used in the probe response, and further comprising modifying the SSID field to be used in the probe response when a determined number of values have been used for the ANQP Domain ID field.

11. A system for the unambiguous identification of non-associated Wi-Fi devices, the system comprising at least one access point, wherein each access point comprises:

a Wi-Fi interface;

a processing unit configured to:

upon receiving a probe request from a Wi-Fi device not associated to the access point, send a probe response addressed to the non-associated Wi-Fi device, wherein the probe response comprises a Hotspot 2.0 Indication element including a ANQP (Access Network Query Protocol) Domain ID field with a determined value;

receive an action frame sent by the non-associated Wi-Fi device in response to the Hotspot 2.0 Indication element of the probe response;

obtain a static MAC address of the non-associated Wi-Fi device from the source address of the received action frame; and identify the non-associated Wi-Fi device based on the obtained static MAC address, wherein the processing unit of each access point is configured to periodically modify the value of the ANQP Domain ID field to be used in the probe response, and wherein the processing unit of each access point is configured to modify the SSID field to be used in the probe response when a determined number of values have been used for the ANQP Domain ID field.

\* \* \* \* \*